United States Patent

Vogel

[15] 3,639,188

[45] Feb. 1, 1972

[54] METHOD OF MANUFACTURE OF A MAGNETIC DISK AND RECORDING SURFACE

[72] Inventor: Marcel J. Vogel, San Jose, Calif.

[73] Assignee: International Business Machines Corporation, Armonk, N.Y.

[22] Filed: May 21, 1970

[21] Appl. No.: 39,204

[52] U.S. Cl. ..............................156/231, 156/235, 156/238, 156/239, 156/242, 156/243, 156/246, 156/272

[51] Int. Cl. ......................B44c 3/02, B29d 14/00, B44d 5/04

[58] Field of Search ..................156/230, 231, 235, 238, 239, 156/246, 247, 243, 272, 242

[56] References Cited

UNITED STATES PATENTS

| | | | |
|---|---|---|---|
| 2,965,532 | 12/1960 | Taylor | 156/230 X |
| 3,401,070 | 9/1968 | Brown | 156/230 |

*Primary Examiner*—Carl D. Quarforth
*Assistant Examiner*—Roger S. Gaither
*Attorney*—Hanifin and Jancin and Melvyn D. Silver

[57] ABSTRACT

A continuous method of manufacturing a magnetic disk comprising the steps of (1) coating a smooth surface of a temporary substrate, such as Mylar, with a magnetic coating; (2) overcoating the magnetic coating with an adhesive coating, the combination of the magnetic coating and the adhesive overcoating comprising a transfer coating; (3) placing at least the first surface of a disk-shaped substrate, such as an aluminum substrate, into contact with the transfer coating; (4) applying sufficient pressure between the first surface and the transfer coating to cause the transfer coating to adhere to the first surface, the adherence of the transfer coating to the first surface being greater than to the temporary substrate, and (5) removing the temporary substrate. Both sides of the disk-shaped substrate can be coated at the same time in a preferred embodiment utilizing as the adhesive either a thermoplastic or thermosetting material.

10 Claims, 11 Drawing Figures

*INVENTOR*
MARCEL J. VOGEL
*BY*
*Melvyn David Silver*
ATTORNEY

METHOD OF MANUFACTURE OF A MAGNETIC DISK AND RECORDING SURFACE

FIELD OF THE INVENTION

Method of manufacturing magnetic storage media, particularly magnetic disks, wherein a magnetic material is brought into contact with a nonmagnetic substrate, in the form of an overcoating to be transferred thereon, to form the final magnetic material coated structure.

BACKGROUND OF THE INVENTION

Various methods of manufacturing magnetic disk materials and magnetic disks are known in the art. Each method has its own advantages and disadvantages. Thus, powdered magnetic material may be compacted and fired into a desired shape. However, the size of the disks required, possibly 14 inches in outer diameter and approximately 0.080 inch thickness, makes such pressing, sintering, and final machining operations difficult and expensive.

One well-known method of manufacturing magnetic disks is to utilize a substrate, such as an aluminum alloy, and spin-coat thereon the magnetic coating material. This process has proven economically feasible and is in wide use in the industry today. There is, however, a variation in thickness of the coated film from the inner diameter to the outer diameter of the disk, and a variation in the strength of the film from the inner to the outer diameter. Consequently, there is also a variation in magnetic field strength from the inner diameter to the outer diameter of such a spin-coated disk. Further, other problems, such as pinholes, dust inclusions, and substrate imperfections, arise in the preparation and manufacture of spin-coated disks, the cumulative effect of which is to lower the quality of the final product.

Thus, the object of this invention is a transfer coating method of manufacturing a magnetic disk by the transfer of a magnetic film from a temporary to a permanent substrate to provide a disk including the following properties:

1. Uniform magnetic film thickness from the inner diameter to the outer diameter of the disk.
2. Uniform magnetic film strength from the inner diameter to the outer diameter of the disk.
3. Uniform magnetic field strength from the inner diameter to the outer diameter of the disk.
4. Uniform packing density of magnetic material across the disk surface.
5. A magnetic surface uniformly flat from the inner diameter to the outer diameter of the disk.
6. Uniformity of magnetic surface without a final grinding or lapping step.

A further object of this invention is a manufacturing method that allows for automated inspection of the magnetic film prior to transfer of the film from the temporary to the permanent substrate.

SUMMARY OF THE INVENTION

These and other objects are met by the method of this invention. Briefly stated, this invention comprises a continuous method of manufacturing a magnetic disk having the steps of first, coating the smooth surfaces of a pair of temporary substrates, such as a Mylar* (*Polyethylene terephthalate—Mylar is a trade name of E. I. Dupont Co., Wilmington, Del.) polyester sheet, with a magnetic coating material. After setting, this magnetic coating material is in turn overcoated with an adhesive coating, the combination of magnetic coating and adhesive coating comprising a transfer coating. Then, the transfer coating upon the temporary substrate is placed in contact with both surfaces of a disk-shaped substrate. Sufficient pressure is applied between the surfaces of the substrate and the transfer coatings to cause the transfer coatings to adhere to the disk surfaces, the adherence of the transfer coating to the disk surfaces being greater than to the temporary substrate. The temporary substrate may now be removed, leaving a magnetic coating adherent to the disk-shaped substrate.

Since the temporary substrate, such as a sheet of Mylar, can be made extremely smooth and uniform in its surface composition and smoothness, the transfer coating in turn will be smooth and uniform. Various types of adhesive, such as thermosetting or thermoplastic, may be utilized in coating both sides of a disk-shaped substrate simultaneously.

This invention will best be understood in conjunction with the following drawings and specifications.

GENERAL DESCRIPTION

Figure 1:
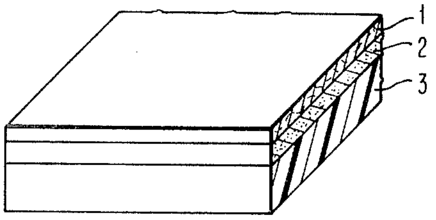
FIG. 1 is a cross-sectional schematic showing the transfer coating upon the temporary substrate.

A number of magnetic inks are well known in the art. A magnetic ink for the purposes of this disclosure may be defined as a fluid dispersion of ferromagnetic particles in a fluid medium composed of a film-forming agent in a grouping of solvents to transpose the fluid system to a solid film by means of solvent evaporation. One example of such a magnetic ink is, in volume percent, 53 percent of an acrylonitrile-butadiyene-styrene ter-polymer, 40 percent gamma iron oxide, 2 percent of a conductive carbon, 5 percent of a soyalecthin, a solvent combination being 3 percent of M.E.K. and 1 percent toluene.

The above example is a thermoplastic ink.

A thermosetting ink is the same as above, but substituting a polyvinyl butyral resin for the A.B.S., to which is added a di-isocyanate or phenolic resin to convert the vinyl acetal resin. In the method of this invention, this magnetic ink is applied to a temporary substrate. The temporary substrate is one that is used to carry the magnetic coating material, but will form itself no part of he final magnetic disk structure.

Such a temporary substrate may include rigid or nonrigid materials such as polished stainless steel, an electroformed metal, chromium-plated glass, chromium-plated metal, Mylar polyester metallized with a layer of aluminum for example, or plain Mylar polyester. Since flexible materials such as Mylar polyester can be obtained in roll form, or continuous loop form, with good surface smoothness, such a substrate is much to be preferred.

Thus, having a magnetic ink and a temporary substrate, as described above, the magnetic ink is applied by any of a number of conventional coating techniques to the temporary substrate. These techniques would include gravure printing, meniscus coating, or doctor-blading, for example. Any of the well-known coating techniques appear suitable for the coating of the temporary substrate. At this point, no field orientation of the magnetic material is done in the preferred embodiment, but instead compaction of the magnetic material is done by means of a smoothing bar while the coating still contains some residual solvent. This assists the coating in assuming a uniform thickness across the entire substrate. No curing of the coating is done at this point. The only object at this point is to apply the magnetic ink, allow it to transform to a solid by solvent evaporation, and assist by the smoothing bar, o compact the film to its maximum density with uniform thickness. Calendering of the coating to compact the coating still further may also be done.

At this point, after the coating has formed a film-type surface, application of an adhesive layer to the magnetic coating is applied. Any conventional coating method may be used. The adhesive overcoating may be of the thermoplastic or the thermosetting type. For example, adhesives of the polyvinyl butyral family, or polyvinyl formaldehyde family may be utilized. One preferred adhesive is Butvar-B76, a polyvinyl butyral made by the Monsanto Chemical Company, St. Louis, Mo., which is a thermoplastic resin.

Referring to FIG. 1, the structure then appears as the adhesive overcoating upon the magnetic coating 2 upon the temporary substrate 3.

Within the normal aging limitations of the materials utilized, it is evident that the temporary substrate with its affiliated transfer coating, the transfer coating being defined as the combination of the adhesive and magnetic coatings, may be made at one physical location for use at a second physical location. Thus, additional flexibility of manufacturing capabilities is afforded by the process being described.

Another obvious advantage of the method of this invention is the lack of complexity of the magnetic coating and adhesive formulations. Since separate coatings are used, problems arising with the attempt to formulate a single coating having both magnetic, leveling, and adhesive properties are eliminated.

Figure 3:
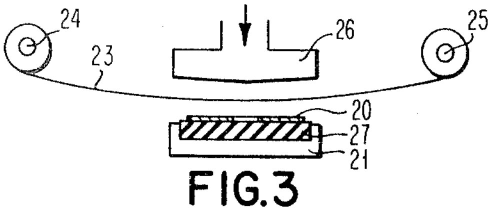
FIG. 3 is a cross-sectional drawing showing greater details of the apparatus of FIG. 2.

The final disk may be prepared in the following manner. Assume that the substrate to be utilized is a highly polished aluminum disk of approximately 14 inches in outer diameter. A disk blank 20 may be inserted into a holder 21. Assuming that the transfer coating 22 has been made upon a Mylar temporary substrate 23, in continuous roll form, then the temporary substrate may be positioned over the disk blank, in a continuous fashion between a feed roller 24 and takeup roller 25. A stamping surface 26 is positioned to bring the temporary substrate having the transfer coating 22 thereon into contact with a raised portion of the disk blank 20. This is further shown in FIG. 3. Also shown in FIG. 3 may be a resilient support 27, such as a silicone rubber material, to provide additional support for the disk. The stamping element 26 is brought into contact with the temporary substrate 23. The stamping element may be heated to a predetermined temperature depending upon the nature of the thermoplastic adhesive. Also, the travel of the stamping element will be determined by the necessary transfer pressure.

Upon making contact with the temporary substrate 23 and the permanent substrate 20, and for the necessary length of time to effectuate transfer, the stamping element 26 then reverses direction and withdraws from contact. Simultaneously, the disk's upward movement may trigger an air blast at the position 30 as shown, to assist in the release of the temporary substrate from he transfer coating. The takeup reel would then proceed to move as the temporary substrate separates from the transfer coating, which is now adhered to the permanent substrate 20.

If it is desired to double coat the disk, then the blank can be turned over and placed back into the die, while the takeup reel advances temporary substrate 23 having transfer coating 22 thereon, to position the transfer coating material and temporary substrate for a second transfer operation on the second surface of the disk.

Figure 5:
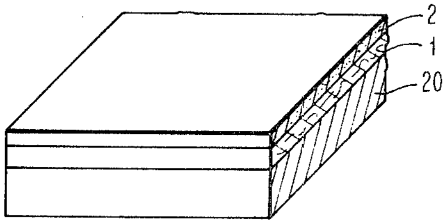
FIG. 5 is a cross-sectional schematic of the finished disk.

FIG. 5 shows the cross section of part of the finished disk, showing the permanent substrate 20, the adhesive layer 1, and the magnetic coating 2.

The smooth silicone rubber support 27, mentioned previously, acts to protect the film from scratching and to assist release of the film after stamping of the other side.

In the preferred embodiment, both sides of the disk are coated at the same time. Two means for achieving this are shown in FIGS. 6 and 7.

Figure 2:
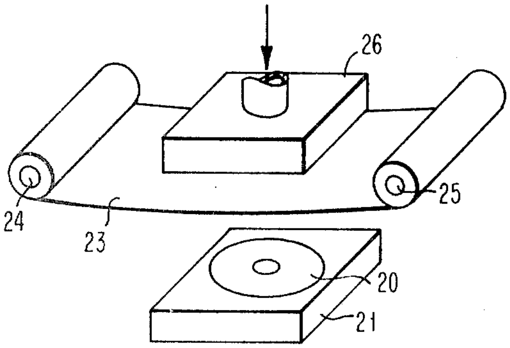
FIG. 2 shows a first method of transferring the magnetic coating from a temporary substrate to a permanent substrate.
Figure 6:
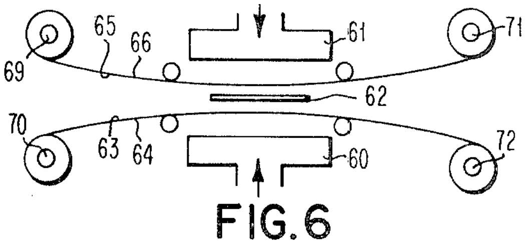
FIG. 6 shows a double-stamping method of forming the magnetic coating on both sides of a permanent substrate simultaneously.

In FIG. 6, the permanent substrate disk blank is placed between what essentially comprises dual mechanisms of FIG. 2. The major difference, of course, is that both surfaces of the disk are exposed, and stamping elements 60 and 61 simultaneously approach the substrate 62 to contact transfer coating 63 on temporary substrate 64, and transfer coating 65 on temporary substrate 66. Air release may also be utilized to assist in stripping after the stamping elements, which again may be at a predetermined temperature, and applying a predetermined pressure for a given length of time, withdraw from contact with the disk surfaces. Feed rolls 69 and 70, and takeup rolls 71 and 72 serve the same function as described in connection with FIG. 2.

Figure 7:
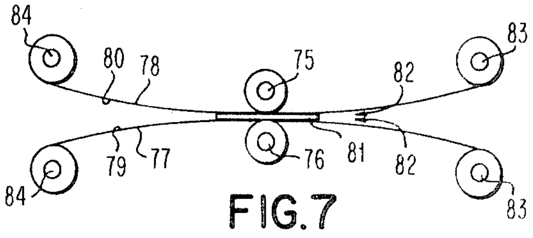
FIG. 7 shows a heated role technique for coating both sides of the permanent substrate with the transfer coating.

An alternative method is shown in FIG. 7, whereby heated rolls 75 and 76 contact temporary substrates 77 and 78 having transfer coatings 79 and 80 thereon, to bring the transfer coatings into contact with both surfaces of the disk 81 simultaneously. Air release may also be utilized as illustrated by the arrows 82, and takeup rolls 83 and supply rolls 84 serve the same functions as previously described.

Disks prepared in this fashion have certain advantages over those prepared by other methods, as by spin coating. A uniform coating from the ID to the OD of the disk is present, as it is possible to uniformly coat the temporary substrate before transfer. Consequently, uniform film strength and magnetic properties are present from the ID to the OD of the finished disk.

Figure 8:
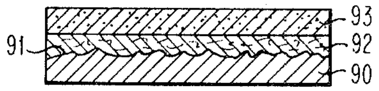
FIG. 8 is a cross-sectional schematic showing the final structure of the magnetic disk and its effect in leveling asperities on the surface of the permanent substrate.

A significant improvement is the elimination of substrate disks discontinuities from influencing the magnetic recording surface. FIG. 8 shows a cross section of a disk surface 91 upon a disk material 90. While exaggerated, the surface 91 of the disk material 90 nonetheless is not perfectly smooth, but contains peaks and valleys as shown. The adhesive layer 92 tends to level or equalize the surface, so that in any event the magnetic coating 93 remains of uniform thickness no matter how bad the asperities in the surface of the original disk material 90 actually are. Thus, the adhesive layer interposed between the magnetic recording surface and the underlying substrate support serves the dual function of leveling asperities while at the same time providing the adhesive means for the magnetic coating to the underlying permanent substrate. Further, the resilience of the adhesive coating serves to cushion impact forces on the disk and helps protect the magnetic film.

Of course, since spin coating is not necessary to distribute the magnetic coating across the surface, oxide distribution remains uniform throughout the entire film. Further, if the magnetic coating when placed upon the temporary substrate is allowed to settle for a given length of time, most of the magnetic pigment in the magnetic ink settles towards the smooth surface of the substrate. Upon transfer, this means that most of the magnetic pigment is located closest to the actual recording surface, resulting in a superior magnetic recording surface. This magnetic recording surface is uniform across the entire surface of the disk.

Still other advantages exist by the use of this method. For example, any asperities on the surface of the permanent substrate are located between the pliable adhesive film and the substrate surface, and do not affect the magnetic recording surface. This requires, of course, that in the actual laying of the magnetic ink upon the temporary substrate that all normal conditions be taken to assure utmost cleanliness.

Figure 9:
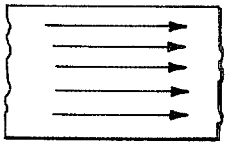
FIGS. 9, 10, and 11 show the method whereby by orienting the temporary substrate magnetic materials, an oriented disk may be manufactured.
Figure 10:
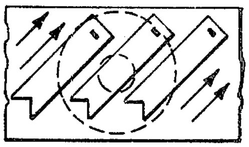
Figure 4:
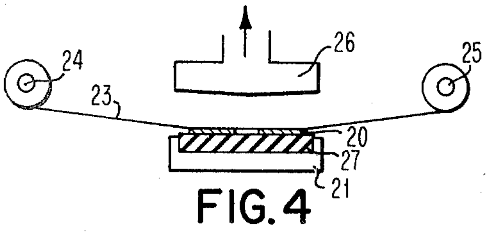
FIG. 4 shows further details of the apparatus of FIG. 3.
Figure 11:
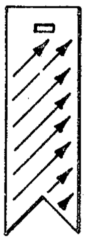

It is necessary, of course, that the magnetic ink utilized have good release characteristics from the temporary substrate, such that the adhesive utilized in turn will be more adhesive to both the magnetic coating and the permanent substrate, so that uniform release will be effectuated.

Where desired, oriented coatings may also be manufactured, as shown in FIG. 9, 10, and 11.

In FIG. 9, after coating the temporary substrate with the magnetic ink, but before the magnetic ink has set, an orienting field may be utilized. After the film has set, most of the magnetic particles will be oriented in the direction of the magnetic field. If it is desired that the final disk or strip materials have a particular configuration, such as a 45° angular magnetic orientation along the surface, then as shown in FIG. 10, the substrate need only be placed beneath the film in such a manner that upon transfer, transfer occurs at the 45° orientation angle. This is shown in FIG. 11. The effect, of course, is most striking upon a nondisk-shaped substrate, as shown in FIG. 11.

In essence then, by the use of the temporary substrate, what has been disclosed is a continuous method of manufacturing a magnetic disk having the steps of first, coating the smooth surface of the temporary substrate with a magnetic coating. The magnetic coating is in turn overcoated with an adhesive coating, with the combination of the magnetic coating and adhesive coating comprising a transfer coating. The surfaces of a disk-shaped substrate are then placed into contact with the transfer coating. Next, by application of sufficient pressure between the surface and the transfer coating, the transfer coating can be made to adhere to the surface. This requires the release characteristics between the magnetic film and the temporary substrate to be such as to allow this. Lastly, the temporary substrate is removed. Of course, adhesive materials may be utilized requiring no heat, but only be pressure-sensitive to effectively transfer.

Other adhesives may be utilized of the thermoplastic or thermosetting type, that do in fact require the use of heat to form the permanent bond. This, however, is completely acceptable. Where heat is necessary, it is always desired that the minimum temperatures necessary to set the materials be used.

Where a thermoplastic or thermosetting material is utilized, heat and pressure may be simultaneously applied during the transfer of the transfer coating to the permanent substrate. Alternatively, however, the adhesive may be applied to the permanent substrate, with the magnetic material applied to the temporary substrate. Depending on the nature of the adhesive material, such as one that sets very readily, this may, in fact, be a desired method. Nonetheless, the option is available to those skilled in the art depending on the particular properties desired in the final magnetic disk. Obviously, either technique—transfer coating having both magnetic and adhesive, or separate adhesive coatings—may be utilized to effectuate either a one-sided or dual-sided transfer process.

The magnetic ink, having been applied to the temporary substrate, may be further compacted, to increase its density; and may further be smoothed by use of smoothing bars to achieve a very uniform thickness of magnetic material. Further, as stated previously, it is advantageous to allow the magnetic ink to form a film having a greater concentration of magnetic particles near the smooth surface of the temporary substrate prior to the adhesive coating step. For continuous processing, it is also advantageous to allow the magnetic ink to form a film having a greater concentration of magnetic particles near the smooth surface of the temporary substrate prior to the adhesive coating step. For continuous processing, it is also advantageous to utilize a temporary substrate of extended length, such as roll form Mylar.

Another obvious advantage of the method of this invention is the lack of complexity of the magnetic coating and adhesive formulations. Since separate coatings are used, problems arising with the attempt to formulate a single coating having both magnetic, leveling, and adhesive properties, are eliminated.

What is claimed is:

1. The continuous process of manufacturing a magnetic disk by the steps of:
- providing a pair of temporary substrates each of which has an ultrasmooth surface and being of extended length,
- coating each of the ultrasmooth surfaces with a solvent-based magnetic coating,
- orienting the magnetic coating on each of the substrates by subjecting said coating to a magnetic field during solvent evaporation to set the orientation,
- overcoating the oriented magnetic coating with an adhesive overcoating, the oriented magnetic coating and the adhesive overcoating forming an elongated transfer coating,
- bringing each of the adhesive surfaces of the transfer coatings into a substantially parallel and spaced-apart relationship,
- inserting a permanent disk-shaped substrate between the spaced-apart adhesive surfaces on the temporary substrates,
- applying pressure simultaneously to the uncoated surfaces of each of the spaced apart temporary substrates, at the area where the permanent substrate is inserted, to contact and adhere the transfer coatings to the permanent disk substrate surfaces whereby a disk is produced having on each side thereof an oriented magnetic transfer coating with an ultrasmooth surface.

2. The method of claim 1 wherein said adhesive overcoating is a thermoplastic material.

3. The method of claim 1 wherein said adhesive overcoating is a thermosetting material.

4. The method of claim 1 including a step of applying heat as well as pressure during the transfer of said transfer coatings to said permanent substrate surfaces, the heat applied causing the adhesive coating to adhere sufficiently to said surfaces to allow later release from said temporary substrates.

5. The method of claim 1 including a step of applying said adhesive coating to said permanent substrate surfaces as well as to said magnetic coating.

6. The method of claim 1 wherein said magnetic coating step comprises placing a magnetic ink into contact with said smooth surfaces, said magnetic ink comprising a fluid dispersion of ferromagnetic particles in a fluid medium comprising a film-forming agent and a grouping of solvents to transpose the fluid system to a solid film by means of solvent evaporation.

7. The method of claim 6 including a step of leveling said magnetic coating on said temporary substrates by means of a smoothing bar while said magnetic ink contains residual solvent.

8. The method of claim 6 including a step of allowing said magnetic ink to form a film having a greater concentration of magnetic particles nearer said smooth surfaces than farther away from said smooth surfaces prior to said adhesive overcoating step.

9. The method of claim 1 including a step of leveling said magnetic coating prior to application of said adhesive overcoatings.

10. The method of claim 1 including a step of compacting said magnetic coating to increase the density thereof, prior to said adhesive overcoating.

* * * * *